Patented Jan. 17, 1939

UNITED STATES PATENT OFFICE

2,144,150

STABILIZATION OF IODINE IN SALT AND OTHER FEED MATERIALS

Edwin B. Hart and Walter B. Griem, Madison, Wis., and La Verne E. Clifcorn, Chicago, Ill., assignors to Wisconsin Alumni Research Foundation, Madison, Wis., a corporation of Wisconsin No Drawing. Application June 13, 1938,
Serial No. 213,446

15 Claims. (Cl. 99—143)

This application is a continuation-in-part of our copending application Serial Number 747,420, filed October 8, 1934.

Iodine is an essential element for protection against common goiter or the enlargement of the thyroid gland. The most practical way to distribute iodine to man as well as beast for this purpose, is by the iodization of salt; but it is also accomplished by the iodization of other commercial dry feed and feed supplement materials, as, for example, feeding mineral mixtures, commercial limestones, feeding limes, commercial earth salts, calcium and/or magnesium carbonates. These materials all find their way into human or animal nutrition. The usual method of iodization of salt and these other materials is to associate by mixing therewith a suitable quantity of potassium iodide.

It has been found, however, that, although the salt or other material in the course of manufacture is treated with the proper amount of iodide, the iodine in the mixture becomes unstable and the mixture gradually loses its iodine content, so that by the time the product reaches the consumer it may have lost all or a greater portion of its iodine content.

Efforts in the past to overcome this loss on the theory that if the salt or other material which is to carry the iodide is rendered alkaline by the addition of an alkaline salt, such as sodium carbonate, sodium bi-carbonate, magnesium carbonate, calcium carbonate, or sodium phosphate, the potassium iodide in the salt or other mixture will be stabilized, but these mixtures have not been successful, as investigation has shown.

We have discovered by extensive experiment that the loss of iodine is brought about by oxidation of the iodide which results in its conversion into free iodine in an elemental vapor stage which is readily liberated from the salt or other material. This is evidenced by the fact that iodized salt or other feed materials contain traces of many substances, such as iron, copper and manganese in their highest state of valency, which are in themselves strong oxidizing agents, and their presence in the mixture brings about this conversion of the iodide to free iodine. The oxygen in the air also plays an important part in the liberation of iodine by photochemical oxidation, by direct oxidation of the iodide in a slightly acid salt or other mixture, and by oxidation by ozone present in the air and originating from oxygen. These reactions occur only in the presence of moisture.

We have found that by the use of a reducing agent in the mixture of salt or other material and potassium iodide or other suitable iodine carrier, the iodine content of the mixture is rendered stable and the loss of iodine prevented. The reducing agent acts to prevent the oxidation of the potassium iodide and its conversion to free or elemental iodine.

Our invention includes the use of any reducing agent having the properties or being capable of preventing the oxidation of iodides to elemental iodine, and otherwise not deleteriously reactant with other ingredients of the mixture. Such reducing agents as sodium thiosulfate, sodium hypophosphite, sodium phosphite, starch, glucose, maleic acid, metallic iron, and calcium gluconate have all been found by test as thus effective to prevent oxidation of the iodide.

The various conditions to which iodized salt and other dry nutrition materials are subject in practice, were all taken into consideration and established in carrying out extensive tests and experiments in the determination of the effectiveness of the various reducing agents; for instance, in connection with our investigations of iodized salt, the salt was sometimes placed in bottles and stoppered, or in bags where it would be subject to free circulation of air, or exposed to sunlight, and the iodine content was determined after three to five months' storage.

Following is a table showing the results of experiments conducted with various reducing agents. In these experiments the usual iodized salt was used, comprising commercial salt plus potassium iodide.

| Exp. No. | Description | Initial analysis | Starch test showing loss of iodine | Analysis after 3 months' period |
|---|---|---|---|---|
| 1 | Commercial salt+potassium iodide (KI) in bottle | .0228 | Positive | .0201 |
| 2 | Commercial salt+potassium iodide (KI) in bag | .0228 | | .0170 |
| 171 | Same as #1+.1% Fe | .0221 | Negative | .0226 |
| 176 | Same as #1+.2% Fe+.2% Na₂CO₃ | .0202 | Negative | .0203 |
| 73 | Same as #1+{.05% CuSO₄, .05% FeCl₃} | .0228 | Positive | .00059 |
| 84 | Same as #73+.5% Fe | .0216 | Negative | .0213 |
| 85 | Same as #73+.5% NaH₂PO₂ | .0208 | Negative | .0221 |
| 86 | Same as #73+.5% Na₂S₂O₃.5H₂O | .0206 | Negative | .0206 |
| 89 | Same as #73+.5% Na₂CO₃+.5% Fe | .0213 | Negative | .0210 |
| 90 | Same as #73+.5% Na₂CO₃+.5% NaH₂PO₂ | .0215 | Negative | .0210 |
| 91 | Same as #73+.5% Na₂CO₃+.5% Na₂S₂O₃.5H₂O | .0216 | Negative | .0219 |
| 92 | Same as #73+.5% Na₂CO₃+.5% starch | .0216 | Negative | .0218 |
| 93 | Same as #73+.5% Na₂CO₃+.5% glucose | .0228 | Negative | .0214 |

Experiments Nos. 1 and 2 were intended to represent the usual iodized salt mixtures comprising commercial salt and potassium iodide, stored in bottles or bags for three months, and illustrate the loss of iodine during this period.

Experiment No. 73 represents iodized salt similar to Nos. 1 and 2, in which copper sulfate ($CuSO_4$) and ferric chloride ($FeCl_3$) were present in the mixtures as impurities. Such impurities render the salt acid and are likely to be found present in traces in commercial iodized salts. Furthermore, such impurities are active in rendering the iodide unstable and hastening loss by oxidation.

Where the iodized material is acid, we prefer to use, in addition to the reducing agent, an agent capable of rendering the material alkaline, and experiments Nos. 89 to 93 illustrate this alkaline-producing salt as sodium carbonate ($Na_2CO_3$) in the mixture.

In experiments Nos. 171, 84 and 85, the reducing agents, metallic iron (Fe) and sodium hypophosphite ($NaH_2PO_2$) are mixed with the iodized salt alone and without any alkaline-producing agent present. The results in these cases show negative, that is, that the reducing agent alone is effective to prevent the loss of iodine.

The following formulas are illustrative of mixtures which we have found to be effective in completely stabilizing the iodide:

1. For iodized table salt contained in closed cartons, the addition of .5% sodium carbonate plus .5% sodium hypophosphite.
2. For iodized salt contained in bags or containers where air can circulate freely, the addition of .5% sodium carbonate plus .1% metallic iron in a finely divided or powdered form and suspended in starch.

A suitable stabilizing mixture employing the latter formula is prepared as follows:

5 parts of starch, 5 parts of water, 1 part of powdered metallic iron (passing 100 mesh sieve), 14 parts of common salt are mixed together. No heat is applied in drying this mixture, but it is allowed to stand after stirring until dry. This produces a light grey powder which will not impart off-color to the salt. Two grams of this mixture added to 98 grams of salt gives a mixture containing approximately .1% of iron. 40 pounds of the above mixture per ton of salt will give approximately the same percentage of metallic iron in the iodized salt. For practical convenience the potassium iodide or other iodine carrier can be added to the above mixture as well as the alkaline salt so that a complete mixture of alkaline salt, iodine carrier, and reducing agent is prepared before mixing with the salt itself.

Metallic iron is not only highly effective as a stabilizer, but it is also a harmless and non-deleterient reagent and is therefore acceptable in food. Being black in color, however, it would add specks to the salt and also tend to settle out. To obscure the specks from the color standpoint, it is placed in starch which itself is a reducing agent.

Potassium iodide is referred to above as the iodine carrier because of the fact that it is practically the only iodide compound which is produced commercially for use as a source of iodine for salt and other dry feed mixtures and feed supplements. However, our tests and experiments have shown that the iodine content of any of the other iodides in the group of alkaline iodides (potassium iodide, sodium iodide, ammonium iodide, calcium iodide, and magnesium iodide), is effectively stabilized when associated with salt or other feed mixtures or feed supplements for the purpose of iodization of these materials in accordance with our invention. The iodides in this group lose elemental iodine in the presence of the impurities in these mixtures when used as iodine carriers for feed or feed mixtures or supplements.

To illustrate, the following determinations show the results of stabilization of the iodine content of several of the iodides in the group of alkaline iodides in mixtures including commercial salt.

| In salt | Initial | 1 month |
|---|---|---|
| NaI (sodium iodide): | | |
| Not stabilized | .0196 | .0141 |
| Stabilized | .0179 | .0187 |
| $NH_4I$ (ammonium iodide): | | |
| Not stabilized | .0204 | .0157 |
| Stabilized | .0188 | .0220 |
| $CaI_2$ (calcium iodide): | | |
| Not stabilized | .0143 | .0094 |
| Stabilized | .0161 | .0160 |

In these examples the same formula was used in substantially the same proportions as hereinbefore stated in connection with the stabilization of potassium iodide, except that, instead of sodium hypophosphite, sodium thiosulfate was used as the reducing agent.

As hereinbefore stated, various dietary feed materials, such as mineral feed mixtures, commercial limestones, feeding limes, commercial earth salts, calcium and/or magnesium carbonates are used as means for distributing iodine to humans and animals, but in these materials, as in the case of salt, the iodide is converted to free or elemental iodine and lost, due to the fact that these materials usually contain those impurities, such as iron, copper and manganese, which act upon the iodide to bring about this conversion. Our extended tests and experiments show that the stabilization of the iodine content of these mixtures is accomplished by the use of a reducing agent in the mixture in the same manner as in salt. For instance, in a typical mineral feed mixture containing limestone, bone meal, bone black, super phosphates, salt, charcoal, Glauber's salt, epsom salt, sulfur, bicarbonate of soda, manganese sulfate, oxide of iron, iron sulfate, anise, and potassium iodide, the iodine content was stabilized by incorporating in the mixture sodium thiosulfate and sodium carbonate in substantially the same proportions as found to be effective for iodized commercial salt. Tests showed that the mixture not stabilized and with an initial iodine content of .0583% lost .0083% or 14.2% of the initial content in a period of about 100 days, whereas this same mixture stabilized lost none of its iodine content in the same period.

Likewise, tests of typical mineral mixtures consisting of commercial limestone and potassium iodide (initial iodine content of .1395%) and sodium thiosulfate, showed that the mixture retained the same percentage (.1395%) of iodine content after a period of 120 days. In these instances no added alkaline agent was necessary because the limestone itself was strongly alkaline. Substantially the same proportions of potassium iodide and sodium thiosulfate were used as found to be effective for iodized commercial salt.

We claim:

1. A commercial dry feed mixture in which the iodine content is stable, including mineral food material, an iodide of the group of alkaline iodides, and a reducing agent acting to prevent the conversion of said iodide to elemental iodine.

2. A commercial dry feed mixture in which the iodine content is stable, including mineral food material, an iodide of the group of alkaline iodides, an alkaline agent, and a reducing agent acting to prevent the conversion of said iodide to elemental iodine.

3. A commercial dry feed mixture in which the iodine content is stable, including mineral food material, potassium iodide, sodium carbonate, and sodium thiosulfate.

4. A commercial dry feed mixture in which the iodine content is stable, including mineral food material, potassium iodide, sodium carbonate, sodium thiosulfate, and starch.

5. A stabilized mineral composition including salt, an iodine of the group of alkaline iodides, an alkaline agent, and a reducing agent cooperating to maintain the iodide in a non-oxidized state.

6. A stabilized mineral mixture comprising salt, potassium iodide, an alkaline agent, starch, and a reducing agent all co-reacting to prevent the conversion of the iodide to elemental iodine.

7. A stabilized mineral composition including salt, potassium iodide, an alkaline agent, and a reducing agent cooperating to maintain the iodide in a non-oxidized state.

8. A mineral composition including salt, potassium iodide, sodium carbonate, and a reducing agent having the property of preventing the conversion of the iodide to free iodine.

9. A mineral composition including salt, potassium iodide, sodium carbonate, starch, and an anti-oxidant having the property of preventing the conversion of the iodide to free iodine.

10. A stable mineral composition in which potassium iodide is maintained against conversion to iodine, including salt, potassium iodide, sodium carbonate, and sodium thiosulfate.

11. A stable mineral composition in which potassium iodide is maintained against conversion to iodine, including salt, potassium iodide, sodium carbonate, sodium thiosulfate, and starch.

12. A stable mineral composition in which potassium iodide is maintained against conversion to iodine, including salt, potassium iodide, an alkaline agent, and sodium thiosulfate.

13. A commercial dry feed mixture in which the iodine content is stable, including commercial limestone, an iodide of the group of alkaline iodides, and a reducing agent acting to prevent the conversion of said iodide to elemental iodine.

14. A commercial dry feed mixture in which the iodine content is stable, including commercial limestone, potassium iodide, and sodium thiosulfate.

15. A commercial dry feed mixture in which the iodine content is stable, including commercial limestone, potassium iodide, sodium carbonate, and sodium thiosulfate.

EDWIN B. HART.
WALTER B. GRIEM.
LA VERNE E. CLIFCORN.

CERTIFICATE OF CORRECTION.

Patent No. 2,144,150.   January 17, 1939.

EDWIN B. HART, ET AL.

It is hereby certified that error appears in the printed specification of the above numbered patent requiring correction as follows: Page 3, first column, line 19, claim 5, for the word "iodine" read iodide; and that the said Letters Patent should be read with this correction therein that the same may conform to the record of the case in the Patent Office.

Signed and sealed this 21st day of March, A.D. 1939.

Henry Van Arsdale.

(Seal)   Acting Commissioner of Patents.